United States Patent [19]

Renninger et al.

[11] Patent Number: 5,036,678
[45] Date of Patent: Aug. 6, 1991

[54] AUXILIARY REFRIGERATED AIR SYSTEM EMPLOYING MIXTURE OF AIR BLED FROM TURBINE ENGINE COMPRESSOR AND AIR RECIRCULATED WITHIN AUXILIARY SYSTEM

[75] Inventors: Stanton W. Renninger; Rollin G. Giffin, III, both of Cincinnati, Ohio

[73] Assignee: General Electric Company, Cincinnati, Ohio

[21] Appl. No.: 501,578

[22] Filed: Mar. 30, 1990

[51] Int. Cl.⁵ ............................................. F25D 9/00
[52] U.S. Cl. ........................................ 62/402; 62/87
[58] Field of Search ................. 62/401, 402, 86, 87, 62/88

[56] References Cited

U.S. PATENT DOCUMENTS

| | | | |
|---|---|---|---|
| 1,943,908 | 1/1934 | Woods | 62/136 |
| 2,975,607 | 3/1961 | Bodle | 62/52 |
| 3,002,362 | 10/1961 | Morrison | 62/402 |
| 3,052,106 | 9/1962 | Sampietro et al. | 62/402 |
| 3,289,436 | 12/1966 | Groves et al. | 62/402 |
| 3,696,637 | 10/1972 | Ness et al. | 62/402 |
| 3,735,601 | 5/1973 | Stannard, Jr. | 62/402 |
| 3,967,466 | 7/1976 | Edwards | 62/402 |
| 3,992,891 | 11/1976 | Pocrnja | 62/53 |
| 4,169,361 | 10/1979 | Baldus | 62/402 |
| 4,262,495 | 4/1981 | Gupta et al. | 62/402 |
| 4,265,397 | 5/1981 | Rannenberg | 62/402 |
| 4,404,793 | 9/1983 | Coffinberry | 60/39.07 |
| 4,480,444 | 11/1984 | Conan | 62/402 |
| 4,665,715 | 5/1987 | Signoret | 62/402 |

Primary Examiner—Ronald C. Capossela
Attorney, Agent, or Firm—Jerome C. Squillaro

[57] ABSTRACT

An auxiliary refrigerated air system includes first and second tandemly-arranged auxiliary turbine components, air mixing and dividing valves, an air recirculation loop, an auxiliary air compressor, and a heat exchanger. The air mixing valve is connectable to a suitable input air source for receiving and mixing input air with dilution air and producing an air mixture. The air dividing valve is connected in communication between an exit side of the first auxiliary turbine component and an entrance side of the second auxiliary turbine component for diverting a portion of the energy-depleted air exiting from the first auxiliary turbine component. The air recirculation loop is connected in communication between the mixing and dividing valves for recirculating to the mixing valve the portion of the air diverted by the dividing valve to provide the dilution air to the mixing valve. The auxiliary compressor is drivingly connected to the auxiliary turbine components, connected in communication with the mixing valve, and operable for receiving the air mixture from the mixing valve and producing compressed air upon operation of the first and second auxiliary turbine components. The heat exchanger uses the turbine engine fuel to cool compressed air routed from the auxiliary compressor to the entrance side of the first auxiliary turbine component.

14 Claims, 1 Drawing Sheet

AUXILIARY REFRIGERATED AIR SYSTEM EMPLOYING MIXTURE OF AIR BLED FROM TURBINE ENGINE COMPRESSOR AND AIR RECIRCULATED WITHIN AUXILIARY SYSTEM

CROSS-REFERENCE TO RELATED APPLICATION

Reference is hereby made to the following copending U.S. patent application dealing with related subject matter and assigned to the assignee of the present invention: "Auxiliary Refrigerated Air System Employing Input Air From Turbine Engine Compressor After Bypassing And Conditioning Within Auxiliary System" by S. W. Renninger et al, assigned U.S. Ser. No. 502,893 and filed Apr. 2, 1990.

BACKGROUND OF THE INVENTION

1. Field of the Invention

The present invention relates generally to gas turbine engines and, more particularly, to an auxiliary refrigerated air system on an aircraft employing input air, from a suitable source such as air bled from the turbine engine compressor, and air recirculated within the system.

2. Description of the Prior Art

The requirement has existed heretofore for aircraft turbine engine systems to produce cool air for use in aircraft support systems such as for cabin environmental control and avionic cooling. In one conventional aircraft support system, fresh air is initially obtained by bleeding air from one or more of the aircraft's engines and then conditioned before introduction into the pressurized fuselage of the aircraft. In this support system as described and illustrated in U.S. Pat. No. 4,262,495 to Gupta et al, the bleed air is conditioned by the coordinated operation of a power turbine, a recirculation air compressor, an air filter and an air-to-air heat exchanger of the system. Another known aircraft support system utilizing engine bleed air to heat the engine fuel is described and illustrated in U.S. Pat. No. 4,404,793 to Coffinberry.

The air quantity and air temperature requirements of conventional aircraft support systems have been relatively modest heretofore. The cooling requirements of future turbine engine systems will likely demand significantly increased quantities of air at substantially lower temperatures. One such example is in the area of superconductors. Emerging superconductor technology may find application in future turbine engine systems for power generation, as one example, or in magnetic bearings, as a second example. Although the technology of superconductors has made major advances in elevating the temperature at which they function, a cold or refrigerated temperature by normal standards is still required.

Conventional cold or refrigerated air systems used on aircraft heretofore do not provide air in sufficient quantities and at sufficiently low temperatures to meet the anticipated cooling requirements of future turbine engine systems. Consequently, a need exists for a refrigerated air system which will meet forecasted future requirements.

SUMMARY OF THE INVENTION

The present invention provides an auxiliary refrigerated air system which satisfies the aforementioned needs. The auxiliary system of the present invention combines currently-available turbine engine technologies with a mixture of air, from a suitable source such as air bled from a turbine engine compressor, and air recirculated within the system to produce cold or refrigerated air at sufficiently reduced temperature and in sufficient quantities to satisfy future requirements. For purpose of brevity, as used in the description and claims hereinafter the term "air" is meant to include any other materials in fluid and/or gaseous form besides atmospheric air. By employing the auxiliary system of the present invention, bleed air from the engine at compressor discharge conditions, having a typical temperature of 1150° F., can be reduced to a temperature well below freezing without completely exhausting the pressure potential of the bleed air exiting the auxiliary system.

Accordingly, the present invention is directed to an auxiliary refrigerated air system, such as associated with an aircraft turbine engine. The auxiliary system comprises: (a) first and second tandemly-arranged auxiliary turbine components; (b) an air mixing valve; (c) an air dividing valve; (d) an air recirculation loop; (e) an auxiliary air compressor; and (f) a heat exchanger. Each of the first and second turbine components has respective entrance and exit sides and is operable for receiving air at the entrance sides and producing energy-depleted air at the exit sides. The air mixing valve is connectable to a source of input air for receiving and mixing input air with dilution air and producing an air mixture. The air dividing valve is connected in communication between the exit side of the first auxiliary turbine component and the entrance side of the second auxiliary turbine component for diverting a portion of the energy-depleted air exiting from the first auxiliary turbine component. The air recirculation loop is connected in communication between the mixing valve and the dividing valve for recirculating to the mixing valve the portion of the air diverted by the dividing valve from the exit side of the first auxiliary turbine component to provide the dilution air to the mixing valve.

The auxiliary air compressor of the system has inlet and outlet sides. The auxiliary compressor is drivingly connected to the first and second auxiliary turbine components and connected in communication at the inlet side with the mixing valve. The auxiliary compressor further is operable for receiving the air mixture at the inlet side from the mixing valve and producing compressed air at the outlet side upon operation of the first and second auxiliary turbine components. The heat exchanger has a first side and a second side. The heat exchanger at its first side is connectable in communication with a flow of fluid, such as aircraft engine fuel, which provides a heat sink. The heat exchanger at its second side is connected in communication between the outlet side of the auxiliary air compressor for receiving compressed air therefrom and the entrance side of the first auxiliary turbine component for discharging conditioned air thereto. The auxiliary system also includes a common drive shaft which drivingly interconnects the auxiliary air compressor with the first and second auxiliary turbine components for causing operation of the auxiliary compressor upon operation of the auxiliary turbine components.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
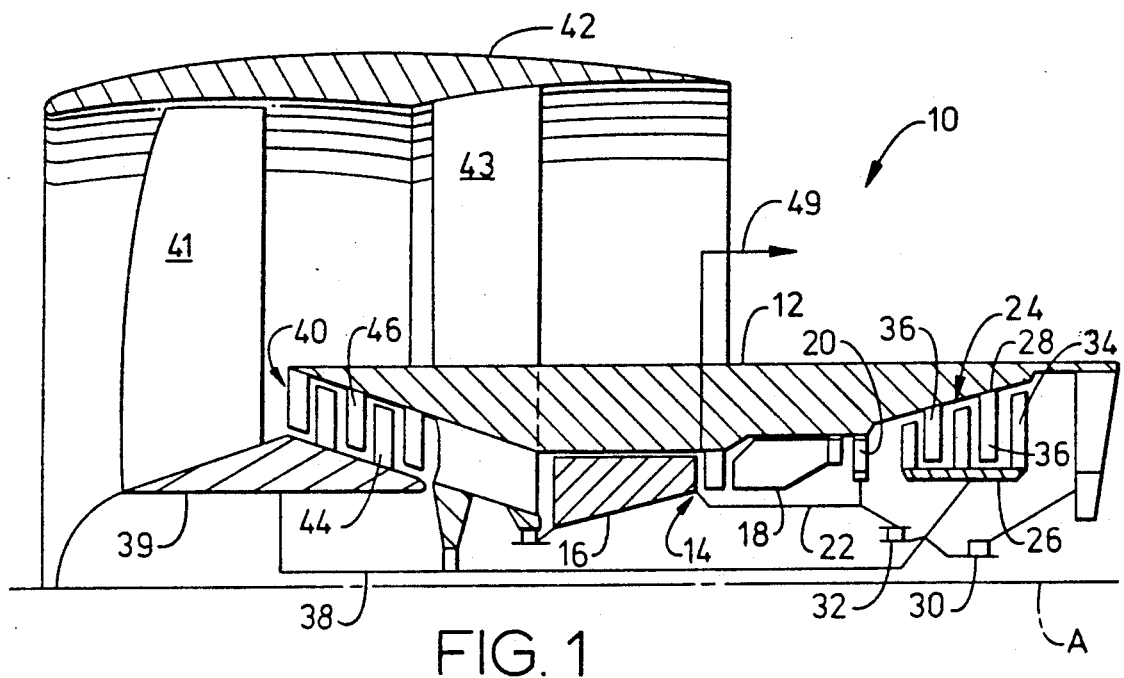
FIG. 1 is a schematic view of a gas turbine engine.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a gas turbine engine, generally designated 10, to which the present invention can be applied. The engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. An annular drive shaft 22 fixedly interconnects the compressor 16 and high pressure turbine 20.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure turbine 24 includes an annular drum rotor 26 and a stator 28. The rotor 26 is rotatably mounted by suitable bearings 30 and includes a plurality of turbine blade rows 34 extending radially outwardly therefrom and axially spaced. The stator 28 is disposed radially outwardly of the rotor 26 and has a plurality of stator vane rows 36 fixedly attached to and extending radially inwardly from the stationary casing 12. The stator vane rows 36 are axially spaced so as to alternate with the turbine blade rows 34. The rotor 26 is fixedly attached to drive shaft 38 and interconnected to drive shaft 22 via differential bearings 32. The drive shaft 38, in turn, rotatably drives a forward booster rotor 39 which forms part of a booster compressor 40 and which also supports forward fan blade rows 41 that are housed within a nacelle 42 supported about the stationary casing 12 by a plurality of struts 43, only one of which is shown. The booster compressor 40 is comprised of a plurality of booster blade rows 44 fixedly attached to and extending radially outwardly from the booster rotor 39 for rotation therewith and a plurality of booster stator vane rows 46 fixedly attached to and extending radially inwardly from the stationary casing 12. Both the booster blade rows 44 and the stator vane rows 46 are axially spaced and so arranged to alternate with one another.

Auxiliary Refrigerated Air System of the Invention

Figure 2:
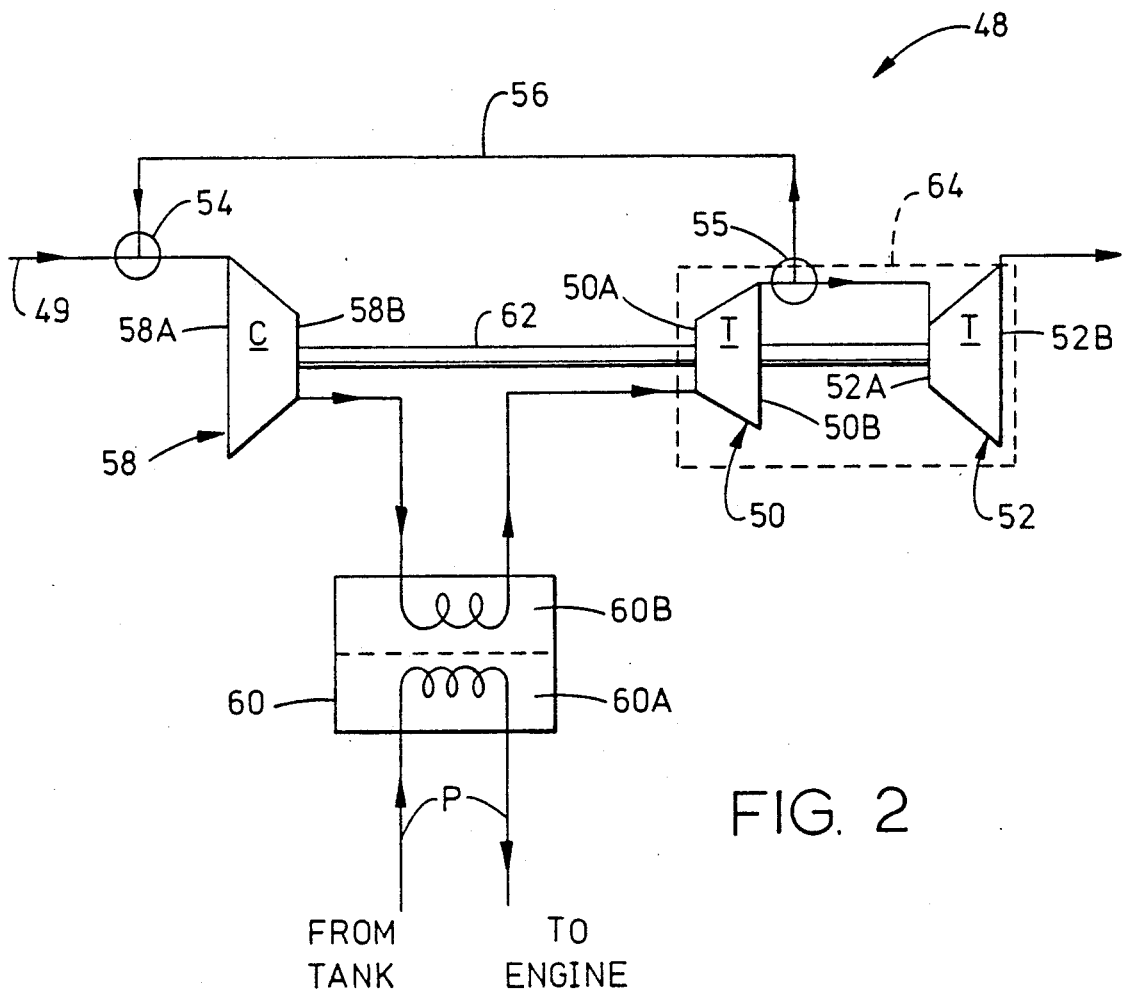
FIG. 2 is a schematic view of an auxiliary cold air production system in accordance with the present invention.

Referring to FIG. 2, there is illustrated schematically an auxiliary refrigerated air system, generally designated 48, constructed in accordance with the principles of the present invention. The auxiliary system 48 utilizes a mixture of input air from a suitable source, such as air extracted or bled off preferably from the core engine compressor 16 of the turbine engine 10 of FIG. 1, and dilution air recirculated within the auxiliary system 48 to provide cold or refrigerated air at the desired reduced temperature and in the desired quantity. Thus, by employing the auxiliary system 48, air at compressor discharge conditions which is bled off from the engine 10, via a conduit 49, to the system 48 can be reduced to a temperature and provided in a quantity to supply contemplated cooling requirements of the aircraft support systems.

In its basic components, the auxiliary refrigerated air system 48 includes first and second tandemly-arranged auxiliary turbine components 50 and 52, an air mixing valve 54, an air dividing valve 55, an air recirculation loop 56, an auxiliary air compressor 58, and a heat exchanger 60. Each of the first and second turbine components 50, 52 of the auxiliary system 48 has an entrance side 50A, 52A and an exit side 50B, 52B. Also, each turbine component 50, 52 is operable in a well-known manner for generating power in response to receiving energy-laden air at its entrance side 50A, 52A and producing energy-depleted air at its exit side 50B, 52B. The auxiliary system 48 also includes a common drive shaft 62 which drivingly interconnects the auxiliary compressor 58 with the auxiliary turbine components 50, 52 for causing operation of the auxiliary compressor 58 in a well-known manner to augment the energy of the air processed by the compressor upon operation of the auxiliary turbine components.

The air mixing valve 54 of the auxiliary system 48 is connected to the core engine compressor 16, via the conduit 49, for receiving and mixing input air bled off from the core engine compressor 16 with dilution air from the air recirculation loop 56 to produce an air mixture to be boosted in energy by the auxiliary air compressor 58. The air dividing valve 55 is connected in communication between the exit side 50B of the first auxiliary turbine component 50 and the entrance side 52A of the second auxiliary turbine component 52 for diverting a portion of the energy-depleted air exiting from the first auxiliary turbine component. The air recirculation loop 56 is connected in communication between the mixing valve 54 and the dividing valve 55 for recirculating to the mixing valve 54 the portion of the air diverted by the dividing valve 55 from the exit side 50B of the first auxiliary turbine component 50 to provide the dilution air received at the mixing valve 54 for mixing with the input air.

The auxiliary air compressor 58 of the auxiliary system 48 has an inlet side 58A and an outlet side 58B. The auxiliary compressor 58 is drivingly connected to the first and second auxiliary turbine components 50, 52 by the drive shaft 62 and is connected in communication at its inlet side 58A with the mixing valve 54. The auxiliary compressor 58, upon being driven by the auxiliary turbine components 50, 52, operates in a well-known manner to receive the air mixture at its inlet side 58A (from the mixing valve 54) and produce compressed air at its outlet side 58B.

The heat exchanger 60 of the auxiliary system 48 has a first side 60A and a second side 60B. The heat exchanger 60 at its first side 60A is connected in communication with a suitable fluid which provides a heat sink, for instance, the aircraft engine fuel. By way of example, the flow path P of the fuel from its storage tank (not shown) to the turbine engine 10 can be diverted through the heat exchanger 60. The heat exchanger 60 at its second side 60B is connected in communication between the outlet side 58B of the auxiliary compressor 58 for receiving compressed air therefrom and the entrance side 50A of the first auxiliary turbine component 50 for discharging conditioned (cooled) air thereto.

In the operation of the auxiliary system 48, bleed air is extracted from the core engine compressor 16 via conduit 49 and mixed by the air mixing valve 54 with a dilution air (which recirculates through the system 48) from the air recirculation loop 56 and dividing valve 55. The mixing valve 54 provides an air mixture which is a high pressure source of air at a temperature significantly reduced from that at which the air is extracted from the core engine compressor 16. At the mixing valve 54, the pressure of the dilution air is substantially equal to the pressure of the air extracted from the core engine compressor 16. In this manner, the mixed air produced by the mixing valve 54 and inputted to the auxiliary compressor 58 has substantially the same pressure as the air that is extracted from the core engine compressor 16.

The air mixture from the mixing valve 54 is passed through the auxiliary compressor 58 to increase its pressure and temperature and then passed through the heat exchanger 60 to lower the mixed air temperature. If fuel is used to cool the air, the fuel may then be burned in the engine combustion system. Fuel is likely to be used as the heat sink because it is readily available on the aircraft to serve this purpose. If some other suitable liquid happens to be available on the aircraft, it could be used in place of the fuel for this purpose.

The cooled mixed air is then passed through the first auxiliary turbine component 50 with a pressure drop less than the pressure rise produced by the auxiliary compressor 58 to compensate for line losses in the auxiliary system 48. Hence, the exit pressure of the air at the first auxiliary turbine component 50 is compatible with the pressure of air extracted from the core engine compressor 16. A temperature drop is associated with the pressure drop. Then, a quantity of air, equal to that extracted from the core engine compressor 16, is passed through the second auxiliary turbine component 52. The remainder of the air exiting the first auxiliary turbine component 50 is routed by the air dividing valve 55 to the air recirculation loop 56 to be used as the cold dilution air previously described.

Energy is extracted by the second auxiliary turbine component 52 to further reduce the temperature of the air. The energy removed by the turbine components 50 and 52 may be equal to that required to drive the auxiliary compressor 58 via the drive shaft 62. If the energy is equal, no external power input (aside from the high pressure bleed air) is required to operate the auxiliary system 48; however, external power could be supplied or power could be extracted to tailor the system to a particular need if desired. The ultimate temperature of the cold or refrigerated air delivered by the system 48 will depend on the back pressure behind the second turbine component 52 relative to the charging pressure and temperature from the source in the core engine 14. Computer calculations have shown that bleed air from the engine 14 at compressor discharge conditions, with a typical temperature of 1150° F., can be reduced to a temperature below freezing using the auxiliary system 48 without completely exhausting the pressure potential of the bleed air at the exit side 52B of the second auxiliary turbine component 52.

The auxiliary system 48 can be provided as a separate, stand alone unit on an aircraft connected to the engine compressor 16 only by the conduit 49. Further, the auxiliary turbine components 50 and 52 can be separate turbine components as shown or separate stages of a single turbine 64, as seen in dashed outline in FIG. 2. The dilution air would be extracted as an inner stage bleed between the stages of the single turbine 64. The turbine engine compressor is only one example of a suitable source of input air to the auxiliary system 48. Other possible sources of input air are ram air, fan bleed air, etc. Any high pressure gas source might be used.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. An auxiliary refrigerated air system, comprising:
 (a) first and second tandemly-arranged auxiliary turbine components having respective entrance and exit sides, said turbine components being operable for successively receiving air at said entrance sides thereof and producing energy-depleted air at said exit sides thereof;
 (b) means connectable to a source of input air for receiving and mixing input air with dilution air and producing an air mixture;
 (c) means connected in communication between said exit side of said first auxiliary turbine component and said entrance side of said second auxiliary turbine component for diverting a portion of the energy-depleted air exiting from said first auxiliary turbine component;
 (d) an air recirculation loop connected in communication between said mixing means and said diverting means for recirculating to said mixing means from said diverting means said portion of the air exiting said exit side of said first turbine component to provide dilution air to said mixing means;
 (e) an auxiliary air compressor having inlet and outlet sides, said auxiliary compressor being drivingly connected to said first and second auxiliary turbine components and connected in communication at said inlet side with said mixing means, said auxiliary compressor being operable for receiving the air mixture therefrom at said inlet side and producing compressed air at said outlet side upon operation of said first and second turbine components; and
 (f) a heat exchanger having a first side connectable in communication with a flow of fluid providing a heat sink and a second side connected in communication between said outlet side of said auxiliary air compression for receiving compressed air therefrom and said entrance side of said first turbine component for discharging conditioned air thereto.

2. The auxiliary system as recited in claim 1, further comprising:
a common drive shaft drivingly interconnecting said auxiliary air compressor and said first and second auxiliary turbine components for causing operation of said auxiliary compressor upon operation of said turbine components.

3. The auxiliary system as recited in claim 1, wherein the pressure of the recirculated air from said recirculation loop is substantially equal to the pressure of the input air to said mixing means.

4. The auxiliary system as recited in claim 1, wherein the pressure of the air at said exit side of said first auxiliary turbine component is substantially equal to the pressure of the input air to said mixing means.

5. The auxiliary system as recited in claim 1, wherein said mixing means is an air mixing valve.

6. The auxiliary system as recited in claim 1, wherein said diverting means is an air dividing valve.

7. The auxiliary system as recited in claim 1, wherein said first and second auxiliary turbine components are two separate turbines.

8. The auxiliary system as recited in claim 1, wherein said first and second auxiliary turbine components are of a single turbine.

9. In combination with an aircraft turbine engine which includes an air compressor, an auxiliary refrigerated air system comprising:
(a) first and second tandemly-arranged auxiliary turbine components having respective entrance and exit sides, said turbine components being operable for successively receiving air at said entrance sides thereof, generating motive power to perform work, and producing energy-depleted air at said exit sides thereof;
(b) an air mixing valve connected in communication to said turbine engine compressor for receiving and mixing input air bled off from said engine compressor with dilution air and producing an air mixture;
(c) an air dividing valve connected in communication between said exit side of said first auxiliary turbine component and said entrance side of said second auxiliary turbine component for diverting a portion of the energy-depleted air exiting from said first auxiliary turbine component;
(d) an air recirculation loop connected in communication between said mixing valve and said dividing valve for recirculating to said mixing valve from said dividing valve said portion of the air exiting said exit side of said first turbine component to provide dilution air to said mixing valve;
(e) an auxiliary air compressor having inlet and outlet sides, said auxiliary compressor being drivingly connected to said first and second auxiliary turbine components and connected in communication at said inlet side with said mixing valve, said auxiliary compressor being operable for receiving the air mixture therefrom at said inlet side and producing compressed air at said outlet side upon operation of said first and second turbine components; and
(f) a heat exchanger having a cool side connectable in communication with a flow of fluid providing a heat sink and a hot side connected in communication between said outlet side of said auxiliary air compression for receiving compressed air therefrom and said entrance side of said first turbine component for discharging cooler air thereto.

10. The auxiliary system as recited in claim 9, further comprising:
a common drive shaft drivingly interconnecting said auxiliary compressor and said first and second auxiliary turbine components for causing operation of said auxiliary compressor upon operation of said turbine components.

11. The auxiliary system as recited in claim 9, wherein the pressure of the recirculated air from said recirculation loop is substantially equal to the pressure of the input air to said mixing means.

12. The auxiliary system as recited in claim 9, wherein the pressure of the air at said exit side of said first auxiliary turbine component is at least equal to the pressure of the input air to said mixing means.

13. The auxiliary system as recited in claim 9, wherein said first and second auxiliary turbine components are two separate turbines.

14. The auxiliary system as recited in claim 9, wherein said first and second auxiliary turbine components are of a single turbine.

* * * * *